July 3, 1962 J. J. ZBAR 3,042,212
LATEX RECONDITIONING APPARATUS
Filed Dec. 11, 1959 2 Sheets-Sheet 1
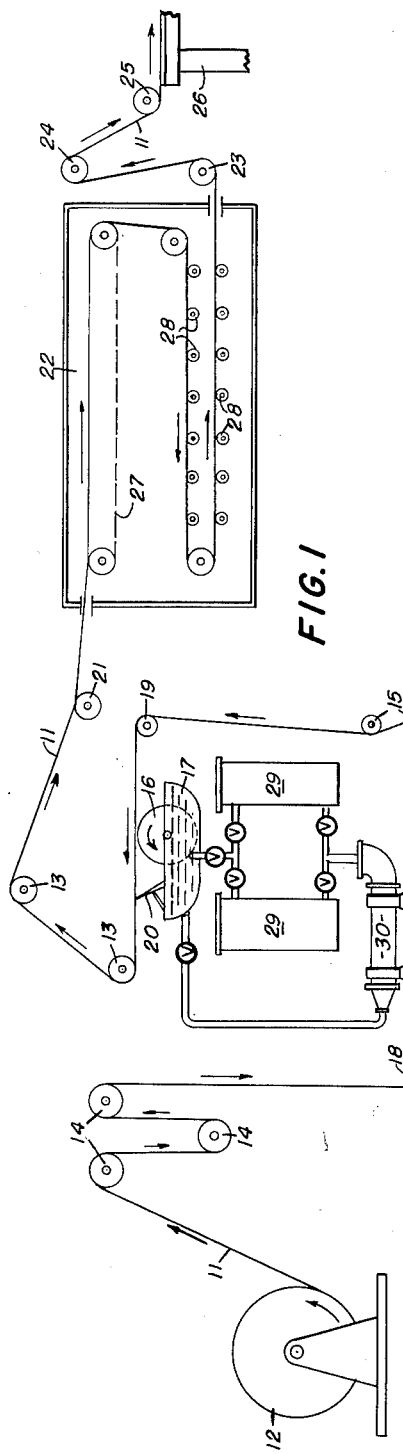
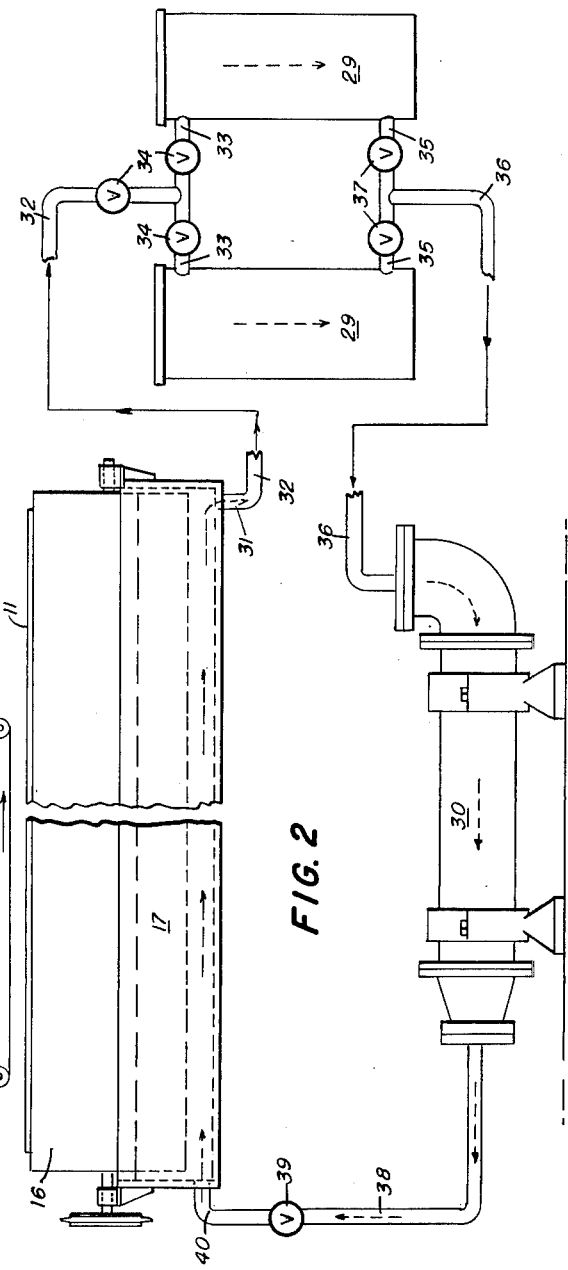
INVENTOR
JACK J. ZBAR
BY *Cameron, Kerkam & Sutton*
ATTORNEYS

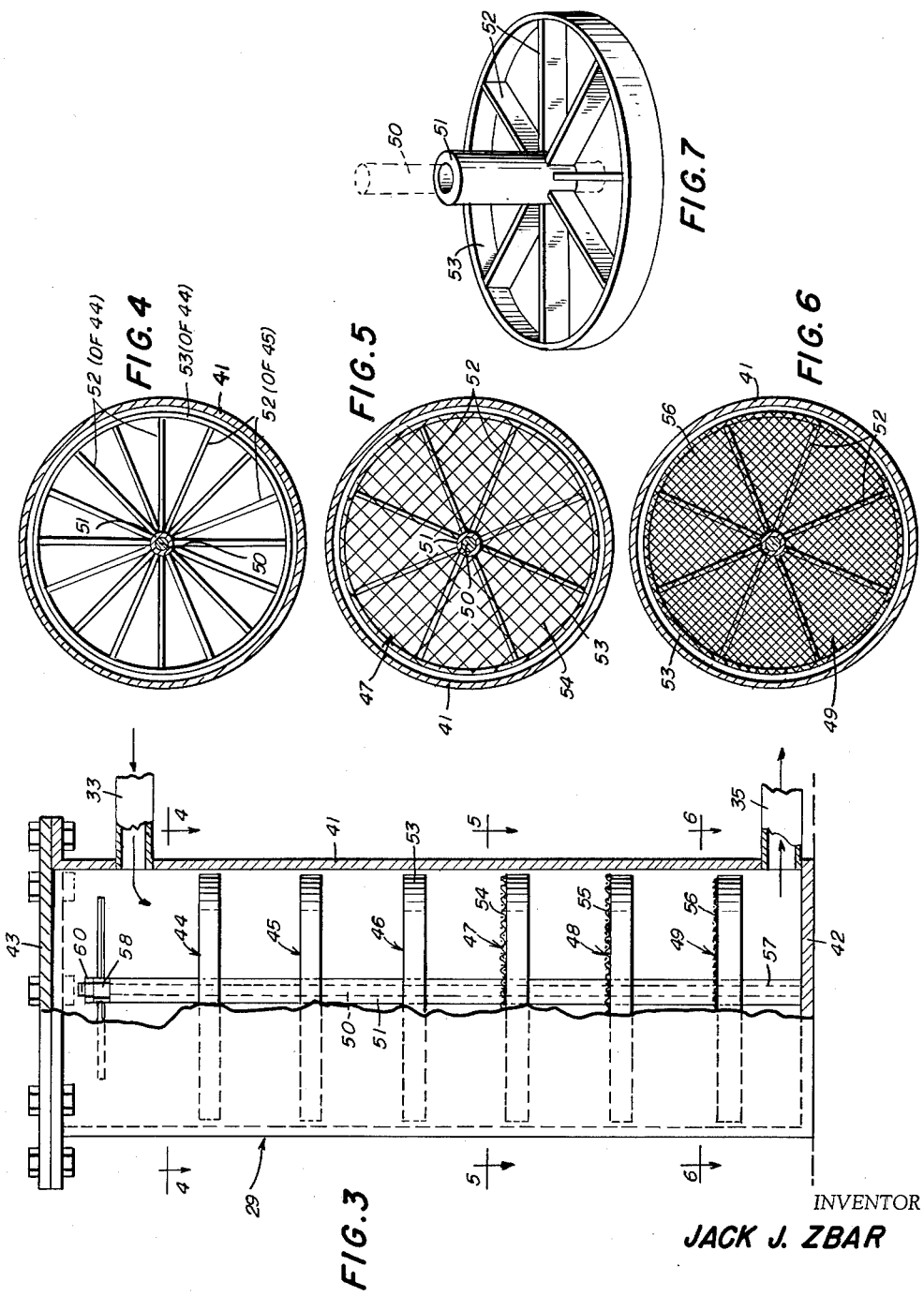

United States Patent Office 3,042,212
Patented July 3, 1962

3,042,212
LATEX RECONDITIONING APPARATUS
Jack J. Zbar, Dalton, Ga., assignor to Lawtex Corporation, Dalton, Ga., a corporation of Georgia
Filed Dec. 11, 1959, Ser. No. 858,918
10 Claims. (Cl. 210—237)

This invention relates to apparatus for coating textile materials with liquid compositions containing rubber, and is particularly directed to the provision of a system for so recycling and reconditioning a supply of such a coating composition that a given quantity thereof can be used for a substantially longer period of time than would otherwise be possible.

In the manufacture of pile or tufted fabrics and other textile materials, it has long been common practice to apply to such material a coating of an aqueous dispersion or colloidal solution of rubber, such as latex, by passing a strip of the material over a reservoir from which the coating fluid is transferred to the material by means of an applicator roller having its axis perpendicular to the direction of movement of the strip. In the machines heretofore used for this purpose, the supply of coating fluid contained in the reservoir gradually becomes contaminated by lint and strings which drop into the reservoir from the fabric being coated, by coagulation of the rubber particles of the coating composition, and by settling of the filler and other solids which may be compounded with the rubber. The textile strings and flakes of coagulated rubber form nuclei on which the lint builds up until, by the end of a normal working day, the coating fluid is so contaminated that it is unusable and must be discarded.

Another problem of long standing in the manufacture of rubber coated pile and tufted fabrics arises from the fact that the textile strings which fall into the reservoir frequently are transferred to the fabric with the coating composition, or become wrapped around the applicator roller. In either case, the result is a defective "spotting" of the coating and a consequently damaged product.

The coating fluids to which the present invention pertains comprise various viscous aqueous compositions containing rubber, usually in the form of natural latex, and other solid constituents such as fillers, vulcanizers and accelerators. In the interest of brevity, these coating compositions will be referred to hereinafter and in the appended claims as "latex," which term will be understood to mean all rubber-containing liquids adapted for use in coating textile materials, particularly those used in the manufacture of carpets, rugs and similar goods. It will also be understood that the term "textile strings" as used herein has reference to pieces of yarn or thread of appreciable length, as distinguished from lint and short fiber fragments, which strings, if deposited on conventional filter screens, would accumulate there in horizontal positions and, as the coagulated rubber flakes and lint build up thereon, clog the filter.

The principal object of this invention is to provide a novel system for recirculating and filtering the latex used in textile coating apparatus of the character described which removes from the recycled latex textile strings and coagulated rubber and effectively prevents the build-up of lint and the settling of solids in the latex reservoir, thereby enabling continued use of a supply of latex long after it would normally have become so contaminated as to be unusable.

Another object is the provision of a unique form of anticlogging filter which is capable of selectively removing textile strings, coagulated rubber and other impurities from latex used in the coating of pile or tufted fabrics and similar materials.

These and other objects of the invention, including the attainment of substantial savings in the cost of operating and maintaining apparatus for coating textile materials with latex, will appear more fully upon consideration of the detailed description of the embodiment of the invention which follows. In this connection, although only one specific form of reconditioning apparatus is described and illustrated in the accompanying drawings, it is to be expressly understood that these drawings are for purposes of illustration only and are not to be construed as defining the limits of the invention, for which latter purpose reference should be had to the appended claims.

In the drawings, wherein like reference characters indicate like parts throughout the several views:

FIG. 1 is a diagrammatic showing of an apparatus for latexing pile or tufted textile material which includes one embodiment of the latex reconditioning system of the present invention;

FIG. 2 is an enlarged diagrammatic view of the recycling and filtering system of FIG. 1 showing the latex reservoir and applicator roller turned through 90° from the position indicated in FIG. 1;

FIG. 3 is a side elevation, partially in section, of one of the filter units of the latex reconditioning system shown in FIGS. 1 and 2;

FIGS. 4, 5 and 6 are horizontal sectional views of the filter unit taken substantially on the lines 4—4, 5—5, and 6—6, respectively, in FIG. 3; and FIG. 7 is a perspective view of one of the individual filter elements of the unit shown in FIG. 3.

The apparatus diagrammatically illustrated in FIG. 1 is, except for the novel latex treating system of the present invention, typical of conventional machines for applying latex coatings to pile or tufted materials used in the manufacture of carpets and rugs. In the machine depicted, a continuous strip 11 of the fabric to be coated is drawn from a supply roll 12 by means of feed rollers 13 around a plurality of spreader rolls 14 which remove wrinkles from the material, through a tensioning device indicated at 15 and over an applicator roller 16 which transfers latex to the strip 11 from a latex reservoir or pan 17 in known manner, guide rollers 18 and 19 being provided at suitable positions along the path of strip 11 between spreader rolls 14 and tensioning device 15 and between the latter and applicator roller 16.

As shown in FIG. 2, applicator roller 16 and latex pan 17 are elongated in a direction perpendicular to the direction of movement of the strip 11, and are of a length greater than the width of said strip so that the entire underside of the strip will be coated by the latex which is carried around on the surface of roller 16 from the supply in pan 17. Latex reservoir 17 is also provided with the customary doctor blade 20 which smooths out and reduces to a layer of uniform thickness the latex coating applied by roller 16, the excess latex which is scraped off the moving strip by blade 20 flowing back down the blade into the reservoir.

From feed rollers 13 the latex-coated strip 11 passes over a guide roller 21 into a gas-fired curing oven 22 wherein the strip makes three passes before leaving the oven and being drawn around rollers 23, 24 and 25 to a cutting table 26 where the strip is cut in known manner into rugs or carpets of any desired size. During the first pass through oven 22, the wet strip 11 is supported on a travelling chain belt 27, while its second and third passes are supported by idler rollers 28.

Referring now to FIG. 2 and the corresponding portion of FIG. 1, the latex reconditioning system of this invention comprises a pair of filter units 29 and a pump 30 which are so connected to one another and to the latex reservoir 17 that latex flows continuously through the reservoir in a direction parallel to the axis of applicator roller 16, from the reservoir to and through one or both of filter units 29, and then back to the reservoir through pump 30.

In the system illustrated, one end of reservoir 17 is provided with an outlet 31 in the bottom thereof which is connected by piping 32 to the inlets 33 of filter units 29, piping 32 being provided with valves 34 which can be manipulated so as to cut either or both of units 29 into or out of service, as desired. The outlets 35 of the filter units are connected by piping 36, including control valves 37, to the intake end of pump 30, and from the discharge end of the pump the latex is recirculated through piping 38 and a valve 39 to the inlet 40 of reservoir 17 which leads through the end wall of the reservoir at the end opposite outlet 31.

Although pump 30 may be of any suitable construction capable of handling viscous liquids such as latex, it is preferable to use a pump of the progressing cavity type, such as the Robbins & Myers "Moyno" pump shown in Patent No. 2,796,029. This type of pump is particularly well adapted for use in the system of the present invention not only because it is designed to handle fluids containing abrasive materials, such as the clay, marble dust or similar filler materials commonly compounded with latex, but also because the character of the turbulence, pulsation and agitation produced by this pump exerts a homogenizing effect which tends to keep the lint particles in the latex in suspension. While the mixing action of the pump does not agitate the latex sufficiently to produce coagulation of the rubber, it is strong enough to prevent settling of the lint so that it may be carried along with the latex and transferred therewith back to the fabric material being coated almost as rapidly as it drops into the reservoir from the fabric as it approaches the applicator roller. Since the lint is not permitted to accumulate, it represents a negligible percentage of the coating composition and is not detrimental to the latexing process.

Filter units 29, which are identical in construction, are provided with a unique arrangement of filter elements which selectively remove from the latex passing therethrough textile strings, coagulated rubber and other undesired impurities which would either interfere with proper coating of the fabric material or cause damage to the pump. The filter elements are so designed and so positioned as to avoid clogging of the filter and at the same time permit the latex to move through the filter by gravity sufficiently rapidly to keep the lint, filler and other solid particles in suspension and prevent their settling.

Referring now to FIGS. 3–7, each filter unit 29 comprises a vertically disposed cylindrical casing 41 having a closed bottom 42 and a removable cover 43. The filter inlet 33 is positioned in the side wall of casing 41 slightly below the upper end thereof while the outlet 35 is likewise located in the side wall just above bottom plate 42, so that the contaminated latex enters the filter casing at the top in a radial direction through inlet 33, flows downwardly by gravity through the plurality of filter elements next to be described, and leaves in filtered condition at the bottom in a radial direction through outlet 35.

In the embodiment illustrated, filter casing 41 contains six filter elements 44, 45, 46, 47, 48 and 49 which are removably supported in superposed, vertically spaced relationship on a core rod 50 which normally rests on bottom plate 42 in an axially extending position in casing 41. Each of filter elements 44 through 49 is of the same basic wheel-like construction, comprising a hollow, vertically elongated cylindrical hub 51 having a bore which is so dimensioned as to slidably fit over core rod 50 and a height such as to maintain the desired spacing between filter elements, a plurality of arms or spokes 52 which are fixed to and extend radially outwardly in a horizontal plane from the lower end of hub 51, and a cylindrical rim 53 which surrounds and is fixed to the outer ends of arms 52. The arms 52, of which any suitable number may be provided (eight in the form shown), are preferably made of flat strips of steel which are welded to hub 51 at equally spaced points about the periphery thereof with their broader sides in vertical planes so as to present only relatively narrow edges to the flow of latex through the filter. Rim 53 is preferably made from flat steel stock of the same dimensions as arms 52 which is rolled and welded into cylindrical form with an outside diameter slightly less than the inside diameter of filter casing 41, and is then welded to the outer ends of arms 52.

The three lowermost filter elements 47, 48 and 49 also include, in addition to the basic structure shown in FIG. 7, mesh screens 54, 55 and 56, respectively, which are preferably made of steel wire and are removably supported on the upper edges of arms 52. The screens are circular in configuration, of substantially the same diameter as rims 53, and are provided with central openings to receive hubs 51. For a reason which will appear hereinafter, screen 56 of the lowermost filter element 49 is of a finer mesh than screens 54 and 55 of elements 47 and 58. For example, screen 56 may be of ½" mesh while each of screens 54 and 55 is of 1" mesh.

The filter elements are assembled on core rod 50 by dropping their hubs 51 over the rod in succession, beginning with element 49, the rod having welded to the bottom thereof a spacer sleeve 57 of the same diameter as hubs 51 which serves to support the lowermost element 49 at an appropriate distance above the bottom 42 of filter casing 41 and filter outlet 35. Each of filter elements 44 through 48 is supported by resting on the upper end of the hub 51 of the element immediately below it, the vertical spacing between the horizontally extending arms 52 and the screens 54, 55 and 56 of the several elements being established by the lengths of those portions of their hubs which extends above the planes of the arms 52. After the filter elements have been mounted on the core rod, a lifting handle, comprising a central sleeve 58 having fixed thereto a pair of diametrically opposite, radially extending handle bars 59, is placed on the upper end of the rod, and the entire assembly is locked together by a nut 60 which engages the threaded extremity of the rod. With this construction, it will be obvious that, by simply removing cover 43 of filter casing 41, the entire filter element assembly can be removed from the casing as a unit whenever it is desired to clean the filter or to replace or repair any of the individual filter elements.

In mounting the filter elements on the core rod, the non-screened elements 44, 45 and 46 are so oriented that the arms 52 of adjacent elements are staggered with respect to one another, as shown in FIG. 4. Although the showing of FIG. 4 indicates that the arms of elements 44 and 46 lie in the same vertical planes with the arms of element 45 offset therefrom by an angle of 22½°, it will be understood that, if desired, the arms of each of these elements may be staggered with respect to those of the other two by offsetting elements 45 and 46 by angles of 15° and 30°, respectively, with respect to element 44. The purpose of staggering the arms of filter elements 44, 45 and 46 will appear more clearly from the following description of the method of operation of the latex reconditioning system of the present invention.

In operating the apparatus of FIG. 1, the reservoir 17 is provided with a supply of latex sufficient to fill the reservoir to about the level indicated by broken lines in FIGS. 1 and 2, which supply may be replenished in any suitable manner as the latex is coated onto the fabric strip 11. As the strip 11 is drawn by feed rollers 13 over applicator roller 16 and doctor blade 20, lint and textile strings frequently fall from the fabric into the reservoir 17. However, recycling of the latex through the reconditioning system illustrated in FIG. 2 not only removes the strings which are apt to become wrapped around the applicator roller or coated out on the fabric, but also prevents lint build-up by removing both the strings and the flakes of coagulated rubber which form in latex compositions when the latter are used over substantial periods of time. The filter units 29 and recirculating pump 30 also exert a homogenizing effect which keeps the lint and other solid particles in suspension, while filler settling is virtually eliminated by the action of the filters coupled with the transverse movement of the latex through the reservoir which is produced by the recycling.

As indicated by the arrows in FIG. 2, there is a continuous flow of latex from reservoir 17 through outlet 31 and piping 32 to and through one or both of filter units 29 and then back to the reservoir by way of piping 36, pump 30, piping 38 and inlet 40, as well as a continuous flow through the reservoir from inlet 40 to outlet 31. Normally, valves 34 and 37 would be so adjusted that the latex flows through only one of filter units 29 while the other is cut out so that it may be cleaned or repaired. If desired, however, both filter units may be cut in for simultaneous on-stream operation.

When the latex enters either of filter units 29 through inlet 33, it flows downwardly by gravity through the superposed filter elements in casing 41, and in so doing leaves the textile strings, flakes of coagulated rubber and other undesired solid substances on the various filter elements. The upper three elements 44, 45 and 46 catch and hold the textile strings on the narrow upper edges of arms 52, and, since the strings hang in vertical directions after being trapped on the arms, very little resistance is offered to the downward flow of the rest of the latex. It will be recognized that, by staggering the arms of filter elements 44, 45 and 46 as previously described, it is possible to catch substantially all of the strings that may be present in the latex and thereby prevent their accumulation on the screened elements 47, 48 and 49.

As the latex continues to move downwardly through the filter, the screens 54 and 55 of elements of 47 and 48 catch the flakes of coagulated rubber but, being of relatively coarse mesh, permit the latex and entrained lint to pass on through. Consequently, and due to the fact that few, if any, textile strings reach screens 54 and 55 where they would accumulate and serve as nuclei for lint build-up, clogging of the filter is avoided. Since most of the flakes of coagulated rubber will be caught on screens 54 and 55, screen 56 of the lowermost element 49 may have a substantially smaller mesh than the preceding screens so as to serve as a protective device for pump 30 without danger of clogging.

When the filtered latex is recirculated by pump 30 from the filter unit 29 to reservoir 17, it still contains a small amount of lint and a quantity of filler material, but the homogenizing or mixing action of the pump and of the filter itself, together with the transverse flow of the latex in the reservoir, keeps the lint and filter particles in suspension and effectively prevents settling.

There is thus provided by the present invention a novel apparatus for reconditioning latex used for coating fabric materials which is of simple construction, easily maintained and capable of effectively removing from the latex contaminants which, if permitted to remain and accumulate in the reservoir from which the latex is applied to the material, would soon result in defective coating and a damaged product. One of the characteristic features of the latex treating system of the invention is a filter unit of unique construction which removes the various impurities selectively and thereby enables continuous filtering without clogging of the filter. An important advantage of this system is that latex which, under the conditions prevailing in coating machines of the character heretofore known, would become so contaminated as to be unusable by the end of a normal working day, can now be saved and reused, instead of being thrown out, with a consequent reduction in expense of considerable proportions.

Although only one specific form of apparatus has been described and illustrated in the accompanying drawings, it will be obvious that the invention is not limited to the particular devices shown, but is capable of a variety of mechanical embodiments. Various changes, which will now suggest themselves to those skilled in the art, may be made in the form, details of construction and arrangement of the elements of the apparatus without departing from the inventive concept. Reference is therefore to be had to the appended claims for a definition of the limits of the invention.

What is claimed is:

1. A filter unit for removing textile strings and coagulated rubber from latex comprising a casing having a vertically disposed axis and an inlet and an outlet positioned adjacent the upper and lower ends, respectively, of said casing so that the latex may flow therethrough by gravity, at least one unscreened filter element positioned adjacent but below the casing inlet and having a plurality of arms extending horizontally across the interior of said casing in substantially radial relationship with respect to the axis of said casing, and at least one additional filter element positioned below said first-named element but above the level of the casing outlet and having a mesh screen extending horizontally across the interior of said casing for catching coagulated rubber in said latex, said arms constituting substantially the only obstruction to vertical flow of the latex offered by said unscreened filter element, whereby textile strings of appreciable length present in the latex may be caught and held on said arms in positions substantially parallel to the direction of flow of the latex through the filter, thereby substantially reducing the tendency to clog the filter by accumulation of said strings in horizontal positions on said screened filter element.

2. A filter unit as claimed in claim 1 including at least two unscreened string-catching filter elements positioned one above the other with their arms in staggered relationship.

3. A filter unit as claimed in claim 1 including at least two screened coagulated rubber-catching filter elements positioned one above the other, and an additional filter element positioned below said coagulated rubber-catching elements but above the level of the casing outlet and having a screen extending horizontally across the interior of said casing of finer mesh than the screens of said coagulated rubber-catching elements.

4. A filter unit as claimed in claim 3 wherein the screens of said coagulated rubber-catching filter elements have meshes on the order of 1″ and the screen of said additional filter element has a mesh on the order of ½″.

5. A filter unit for removing textile strings and flakes of coagulated rubber from latex comprising a vertically disposed cylindrical casing having an inlet and an outlet positioned adjacent the upper and lower ends, respectively, of said casing so that the latex may flow therethrough by gravity, a plurality of filter elements removably supported in said casing in vertically spaced superposed relationship between the level of the casing inlet and the level of the casing outlet, each of said filter elements having a vertically elongated central hub and a plurality of arms extending radially from said hub horizontally across the interior of said casing, at least one of the lowermost filter elements in said casing including a horizontally extending mesh screen supported on the upper edges of the arms of said element and at least the uppermost filter element being unscreened, said arms and said screen constituting substantially the only obstacles to vertical flow of the latex through said casing offered by said filter elements, whereby textile strings of appreciable length present in the latex may be caught and held on said arms in positions substantially parallel to the direction of flow of the latex through the filter, thereby substantially reducing the tendency to clog the filter by accumulation of said strings in horizontal positions on said screen, and a member extending vertically through the hubs of said filter elements on which said elements are removably mounted, said member normally being removably positioned within said casing in a substantially axial position.

6. A filter unit as claimed in claim 5 including at least two unscreened filter elements mounted on the upper portion of said member above the uppermost screened filter element, the arms of one of said unscreened elements lying in vertical planes which are offset angularly about the axis of said casing with respect to the vertical planes of the arms of the other element.

7. A filter unit as claimed in claim 5 including two screened filter elements having screens of relatively coarse mesh on the order of 1", and a third screened element positioned below said coarse screened elements and having a screen of substantially finer mesh than the latter, all of said screened filter elements being positioned below the unscreened elements.

8. A filter unit as claimed in claim 5 including a sleeve fixed to the lower end of said member for maintaining the lowermost filter element above the level of the casing outlet, and a lifting handle removably connected to the upper end of said member.

9. A filter assembly for use in a gravity flow filter unit adapted to remove textile strings and coagulated rubber from latex comprising a vertically extending core rod, a plurality of filter elements removably mounted on said core rod in superposed relationship, each of said filter elements having the same basic structure consisting of a vertically elongated cylindrical hub, a plurality of thin flat arms fixed to said hub and extending radially outwardly therefrom with the flat sides of said arms lying in vertical planes and the narrow upper edges thereof lying in a common horizontal plane, the axial length of said hub being substantially greater than the height of the flat sides of said arms, and a rim extending around and fixed to the outer ends of said arms, and mesh screens supported on the narrow upper edges of the arms of at least two of the lowermost filter elements of the assembly, at least two of the uppermost elements being unscreened, whereby textile strings of appreciable length present in the latex passing through the filter assembly by gravity may be caught and held on the arms of said unscreened elements in positions substantially parallel to the direction of flow of the latex through the filter, thereby substantially reducing the tendency to clog the filter by accumulation of said strings in horizontal positions on said mesh screens.

10. A latex filter assembly as claimed in claim 9 wherein the arms of at least one of said unscreened filter elements lie in vertical planes which are offset angularly about the axis of said core rod with respect to the vertical planes of the arms of an adjacent unscreened element in the assembly.

References Cited in the file of this patent
UNITED STATES PATENTS

| | | |
|---|---|---|
| 758,150 | Schilling | Apr. 26, 1904 |
| 962,324 | Deming | June 21, 1910 |
| 1,335,087 | Bell | Mar. 30, 1920 |
| 2,278,453 | Kracklauer | Apr. 7, 1942 |
| 2,649,758 | Cowgill | Aug. 25, 1953 |
| 2,757,802 | Schmid | Aug. 7, 1956 |